(12) United States Patent
Nothaft et al.

(10) Patent No.: US 8,064,659 B2
(45) Date of Patent: Nov. 22, 2011

(54) TOUCH-FREE FINGER LINE RECOGITION

(75) Inventors: Hans-Peter Nothaft, Neu-Ulm (DE);
Rudolf Hauke, Niederstotzingen (DE)

(73) Assignee: TBS Holding AG, Uitikon/ZH (CH)

( * ) Notice: Subject to any disclaimer, the term of this patent is extended or adjusted under 35 U.S.C. 154(b) by 1349 days.

(21) Appl. No.: 11/491,070

(22) Filed: Jul. 24, 2006

(65) Prior Publication Data
US 2007/0025602 A1    Feb. 1, 2007

Related U.S. Application Data

(63) Continuation of application No. PCT/EP2005/000588, filed on Jan. 21, 2005.

(30) Foreign Application Priority Data

Jan. 23, 2004 (DE) .......... 10 2004 003 783
Nov. 5, 2004 (DE) .......... 10 2004 053 901

(51) Int. Cl.
*G06K 9/00* (2006.01)

(52) U.S. Cl. .......... 382/126; 382/124; 382/254; 396/15; 340/5.53

(58) Field of Classification Search .......... 382/124, 382/126, 254; 340/5.53; 396/15
See application file for complete search history.

(56) References Cited

U.S. PATENT DOCUMENTS

| 3,576,538 | A | 4/1971 | Miller .......... 230/149 |
| 5,278,916 | A | 1/1994 | Walsh et al. .......... 382/4 |
| 6,198,836 | B1* | 3/2001 | Hauke .......... 382/125 |
| 6,404,904 | B1 | 6/2002 | Einighammer et al. .......... 382/124 |
| 6,993,160 | B2* | 1/2006 | Miura et al. .......... 382/115 |
| 7,280,676 | B2* | 10/2007 | Miura et al. .......... 382/115 |
| 7,394,919 | B2* | 7/2008 | Rowe et al. .......... 382/127 |
| 7,440,597 | B2* | 10/2008 | Rowe .......... 382/124 |
| 7,539,330 | B2* | 5/2009 | Rowe .......... 382/124 |
| 2002/0106115 | A1 | 8/2002 | Rajbenbach .......... 382/126 |
| 2006/0038655 | A1* | 2/2006 | Hauke .......... 340/5.52 |

FOREIGN PATENT DOCUMENTS

| DE | 3424955 A1 | 1/1986 |
| DE | 19804129 C1 | 8/1999 |
| WO | WO01/09817 | 2/2001 |

* cited by examiner

Primary Examiner — Stephen Koziol
(74) Attorney, Agent, or Firm — Jacobson Holman PLLC

(57) ABSTRACT

The invention refers to a device for the recognition of finger lines. A housing is provided at which a hand contact area is provided for several fingers. Furthermore a thumb contact area for the thumb of the same hand is arranged. The thumb and the hand contact area are arranged angularly to each other. In the housing at least one scanning unit for the hand, respectively the thumb, contact area is provided which serves for recording of at least the finger lines, respectively the thumb lines.

14 Claims, 4 Drawing Sheets

TOUCH-FREE FINGER LINE RECOGITION

Figure 1:
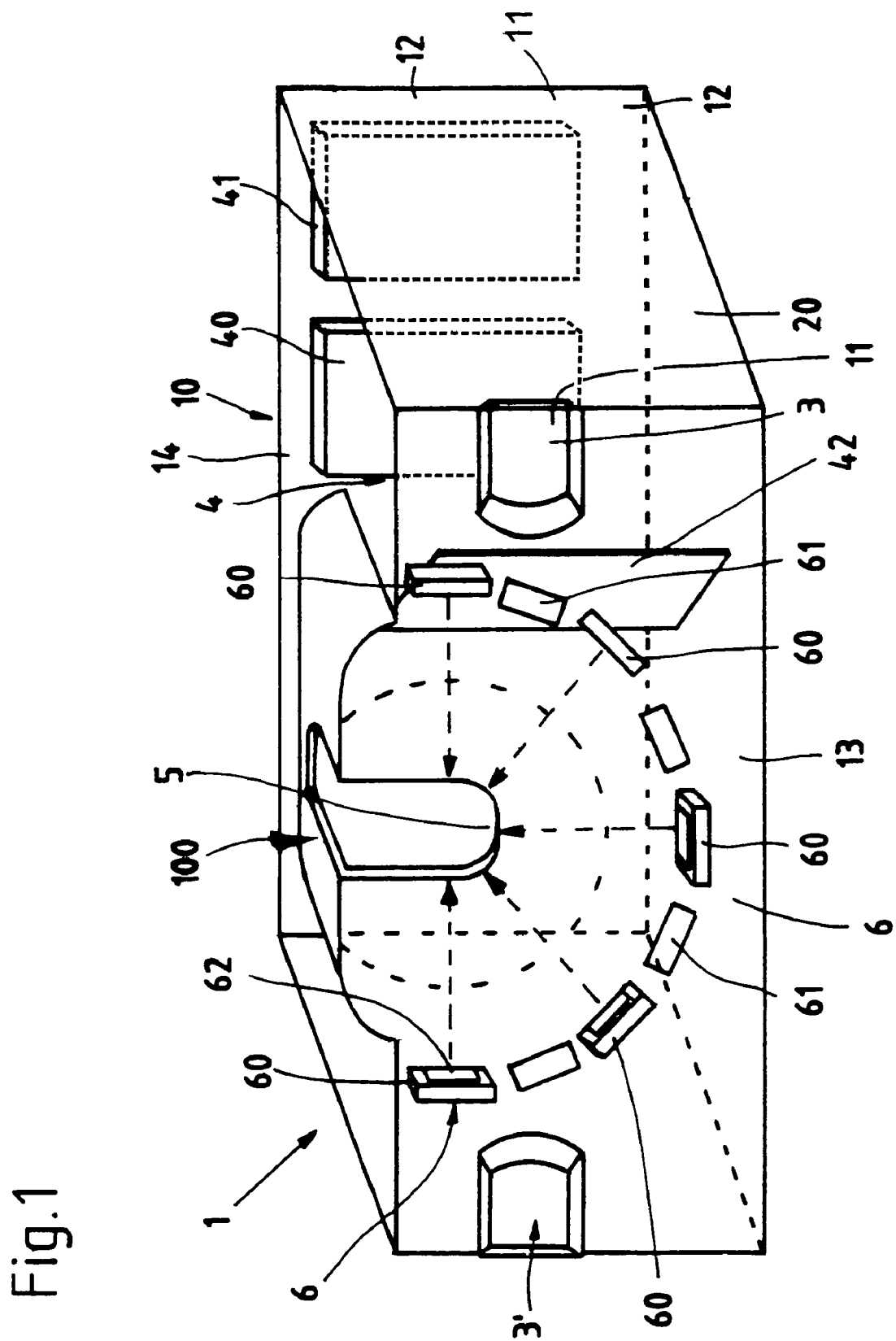

This is a continuation of PCT/EP2005/000588 filed 21 Jan. 2005 and published in German.

The invention refers to a device for the recognition of finger lines.

Arrangements of this kind are, for example, known for forensic data collection of finger lines. For example, fingerprints are taken from persons in such a way that the concerned fingers are treated with ink, and the single fingers are then pressed to a data sheet. Similar to printing thus the patterns of the finger lines are reproduced.

It is a disadvantage that the reproduction is, in this way, not yet available in a data technologic form. For a data system technologic use of this information additional steps are required. Furthermore the taking of fingerprints in this way is very time consuming, as each one of the single ten fingers has to be processed accordingly. Here considerable effort has to be applied in order to secure that, for example, the ring finger of the left hand is assigned also to the ring finger of the left hand.

There is also the relatively high risk with this mechanic printing procedure that the taken fingerprints have a bad quality which leads to an accordingly needed additional time.

Furthermore the rolling of the fingers on a paper support leads to a distortion of the finger lines. The line design is different when pressure is exerted on the fingertips, respectively finger surfaces, compared with non-pressured fingers. These distortions are a basic problem of the recognition of finger lines by putting the fingers on suitable sensor surfaces and the like.

In order to prevent this, for example the International Patent Application WO 99/56237 has made known a system for touch-free recognition of hand and finger lines. By means of this arrangement it is already achieved that, for example, the fingertip is traced, respectively scanned, optically in such a way that, for example, a reproduction is produced which is available also in data technologic respect. The advantage is still that the fingertip is bent cylinder-like, and the optical transmission should be, of course, optimal for a recording as good as possible, that means that the reproduction has to be focused with suitable depth of definition. Another disadvantage is the fact that still even with this arrangement the fingers have to be scanned individually, and the time consumed is still considerable.

Coming from this state of the art it is an object of the invention to provide a device through which the recording of at least finger lines, as for example with fingerprints and so on, is improved.

In order to solve this problem a device for the recognition of finger lines has been proposed, the device having a housing at which a hand contact area for several fingers, preferably four fingers of the hand, is provided, and the device having furthermore a thumb contact area for the thumb of the same hand which is arranged in the housing angularly with regard to the hand contact area, and in the housing at least one scanning unit for the hand, respectively the thumb, contact area being provided which serves for recording at least the finger lines, respectively the thumb lines.

The recording of the finger lines is considerably accelerated and thus improved.

The invention achieves that at the same time several, if not all fingers and the thumb of a hand are recorded. Conveniently this is carried out here touch-free. The advantage of time for that is considerable already as in one picture recording step up to five pictures are produced. The arrangement here is such that the hand contact area, respectively the thumb contact area are positioned to each other in such a way that they can be seized by the hand ergonomically convenient. As the thumb with regard to its longitudinal extension projects approximately rectangularly to the other fingers, it is convenient to design also the orientation of the hand contact area with regard to the thumb contact area angularly, preferably rectangularly in order to improve the ergonomics. If the device is designed ergonomically conveniently the result will also be improved recordings, as persons the finger lines of which has to be recognised will hardly clench up during picture recording and are relaxed. Thus the ergonomically convenient design supports also the result of the processing considerably which reduces additionally the risk of bad recordings because of withdrawn bent fingers and the like. The invention reaches thus, besides a very high speed, also a low number of errors because of the convenient ergonomic arrangement in the thumb contact area and the hand contact area.

The contact area is defined here in such a way that it is the area in which the hand, respectively the thumb, sits close. The invention leaves it open here whether the arrangement is here already touch-free, or whether the hand, respectively the thumb is pressed to the contact area which may lead to distortions. Both modifications are provided according to the invention, although the touch-free recognition of the finger lines, as it will be described further on, has additional advantages. The contact area embraces here touch-free or touching recognition of the finger lines.

In a preferred modification of the invention it is provided that the device has at least one finger collection area for a single finger of a hand. By this embodiment according to the invention it is achieved that optionally with the very same device a reproduction of the hand with the fingers of the hand, and/or the single fingers in a recording, which is then, of course, in detail, is possible. Because of this embodiment it is possible with the invention, that, by means of the device according to the invention, three different fields of application can be reached. It is possible, on the one hand, in the area of hand contact to make complete recordings of the hand, in particular with the single fingers one beside the other, and, on the other hand, to make, by means of a picture collection unit arranged in the collection area of the fingers, single recordings of the fingers. These single recordings then are, of course, accordingly more exact and meaningful.

By the combination of these both areas, that means the finger collection area and the hand contact area at one device, it is, of course then also possible, to produce in an ergonomic way suitable sets of data concerning the finger or the hand lines of a test person, including plausibility and quality check. As it will be described further on, the invention achieves by means of such a design according to the invention that a recording of the finger taken from the finger in the finger collection area can be assigned unambiguously with regard to the position of the finger at the hand, for the comparison with the control copy. The supposed redundant connection of several picture collection units in one apparatus leads eventually to the advantage to be able to take the respective fingerprint or the respective hand line prints in an apparatus with high security, and that a correspondingly good recording quality for the production of the recording of the single finger is possible by providing a finger collection area.

It is an advantage that the housing has in the hand contact area, respectively the thumb contact area, an optically transparent housing part. This protects the sensitive optical, respectively electronic, components in the interior of the housing from being soiled, damaged or coming into contact with water which would obstruct a faultless operation of the arrangement in any case. By the optically transparent design of this housing part it is possible to scan the finger lines, respectively the thumb lines, and to record them correspondingly. The term "optics" is her not restricted to the visual range, but it extends extensively to a larger range of wavelength, namely this range of wavelengths in which the concerned scanning unit works. Optically transparent has to be understood here in that respect that the material of the housing part is optically transparent for the wavelength by means of which the scanning unit operates. Usually this is the visual range and/or the joining infrared or ultraviolet wavelengths ranges.

A modification of the invention provides that the optically transparent housing part has on the side facing the thumb, respectively the finger, an exterior surface which is set back, at least partly, compared with the other surface of the housing. It has been found that already very good results are achieved if a touch-free scanning of the thumb or finger lines is achieved. If the thumb or the fingers touch the surface of the optically transparent housing part distortions or soiling and so on may occur there. At the same time, of course, the thumb or finger to be recorded should be positioned relatively exactly so that the optical recording is sharp. Therefore it is convenient that at least a part of the exterior surface of the optically transparent housing part is set back compared with the other surface of the housing, and thus the distance between the finger/thumb and the housing is increased partially in such a way that touching the optically transparent housing part is prevented.

In order to get a reproduction as good as possible it is an advantage to position the hand, respectively the fingers or the thumb, in such a way that a good focusing, respectively picture transmitting, is possible. For that purpose it is provided that the hand, respectively the fingers, as well as the thumb are positioned in the respective contact area at a distance from the housing, respectively the optically transparent housing part, preferably by guide means. Thus the guide means make sure that the finger is in the correct place, in the focal plane to the picture recording unit which records the picture. At the same time it is also provided that a touch-free finger line recognition is realised which avoids the disadvantages occurring otherwise. This suggestion leads to the fact that no plastic distortion has to be corrected which otherwise occurs through the finger pressed against a surface. Also the bad recording quality is avoided which is a risk with wet fingers. Even too dry fingers lead here to a bad reproduction with the arrangements where the finger is pressed on a surface, for example, of a sensor. As the finger is not supported by a surface, there is no risk of soiling, either, which would lead, in particular with sensitive optical arrangements to corresponding impairments. Besides the application of soiling to the surface, of course, it has also to be taken into consideration that the regular contact of fingers on the sensor surface can obstruct or destroy its coating. All these problems are reliably avoided by using a touch-free arrangement in a preferred modification of the invention.

In order to make sure that the fingers are in an optically advantageous position, that means the picture can be recorded with sufficient depth of definition and contrast, it is convenient to guide the fingers, respectively the hand, accordingly. For that purpose it is provided that the hand contact area is designed like a pocket so that the hand is guided accordingly in the hand contact area.

It is an advantage here that at the thumb contact area, respectively hand contact area, a sensor, in particular a position sensor or contact sensor, is provided. By means of the sensor it can be recognised whether a finger, respectively thumb, is in the respective contact area, for example for producing according recordings, and/or whether the thumb or finger to be recorded is positioned in the focal plane for a recording as sharp as possible. As position sensor, for example, the use of light barriers can be imagined in the respective focal plane which, if interrupted, signalise that the finger is located, for example, too close to the housing, and therefore the picture which is recorded is not sharp. The contact sensor is, for example, designed in that respect whether the thumb/finger is actually in the contact area. This may be carried out, for example, by a touch-free working sensor, or even by mechanic, capacity, inductive, electric or optically working sensors.

Basing on the sensor technology it is basically also possible to provide a control circuit which makes sure that the finger plane with the lines (the same goes, of course, also for the thumb) to be recorded is in the focal plane, independently from the actual design of the finger, that means whether it is a thick or a thin finger. For that purpose, for example, the guide means are then designed movably and form a control circuit with the sensor.

In a preferred modification for that it is provided that at the guide means at least one contact sensor is arranged. The guide means sits close with contact of the thumb, respectively the finger. As a rule, the back side of the finger or the thumb which is not recorded, co-operates with the guide means. This does not impair the recording. The contact sensor registers when the hand sits close to the guide means, and releases a corresponding sequence in the control that it is now possible to record pictures. It is, for example, provided that a picture, respectively a picture sequence, is activated not before all fingers sit close to the guide means, for example the bow. All contact sensors have to be contacted, for example two to three sensors per finger, in order to guarantee reliably that the fingers are in the focal plane of the camera, and the number of errors is as low as possible, respectively a picture quality as high as possible is obtained. Here, for example the guide means can be designed as electrically conductive bows and the sensor recognises then if between two bows a (low) current can flow, if namely the finger is in direct contact with the bow. It is here, for example, also possible to divide the guide means into sectors in such a way that the single fingers are recognised. This can be carried out, for example, by suitable insulating elements in the bow. Of course, also here all other possible types of sensors can be used, as they have been already described above.

In a preferred embodiment it is provided that as guide means in the hand contact area at least one bow is provided which encloses the hand. This arrangement achieves that the hand is guided with two degrees of freedom.

Another arrangement to realise the guide means includes providing a receiving pocket or a receiving shell which is at least partly open at the bottom, for the fingers or fingertips. Different guide means, of course, can be also combined with each other. For a recording as sharp as possible it is an advantage here if the finger, respectively the hand, is positioned in the correct plane for an optimal optical transmission. The guide means are provided to execute just this geometric orientation. However, this may be realised with other guide means in the same way. For example, the sensors are in the receiving pocket, respectively receiving shell.

The invention is not restricted only to recording the finger lines of fingers, thumbs, fingertips, respectively thumb tips. In the same way the arrangement can serve also for recognising and recording of the palm lines.

In a preferred modification of the invention it is provided that at the device two hand contact areas and thumb contact areas each are arranged. This makes it possible that the device records simultaneously pictures of all fingers and thumbs of both hands. These pictures will be indicated in the following as control copies, respectively control copy. Exactly when these copies are produced simultaneously, time is saved accordingly. Both hands are guided here ergonomically convenient in such a way that the fingertips are positioned in the focal plane of the scanning installation, respectively its picture recording unit. The thumbs are here, at the same time, positioned at the thumb contact area. A separate picture recording unit serves for that purpose.

It is convenient here that the hand contact areas are arranged at housing parts opposite to each other, for example at side housing parts. The housing of the device is designed, for example, box-like, and the hand contact areas can be reached at the respectively exterior side surfaces ergonomically conveniently.

Alternatively to that it is possible to arrange the hand contact areas on the same housing part, for example the top or bottom housing part. It is used here that the hand, for example, can be supported on a surface orientated essentially horizontally, or can be put against it from the bottom. In this case then the thumb will be positioned in such a way that it is sits close, for example, to the front housing part by the thumb contact area which is arranged there.

The arrangement is chosen here in such away that the thumb contact area and the hand contact area are orientated to each other rectangularly. The arrangement here is not restricted to a right angle. According to the invention it is also provided that the hand contact area and the thumb contact area, respectively the housing parts holding this area are arranged to each other angularly in an angle region of about 40° to 100°, in such a way that, the fingers, if necessary, also the palm, on the one hand, and the thumb, on the other hand, can be positioned and scanned simultaneously in the respective contact areas. Such a design complies with the human thumb-hand position, and can be used ergonomically conveniently and comfortably.

It is an advantage if the scanning unit has an illumination unit and a picture recording unit. The picture recording unit here can be here a semiconductor component of a camera based on CMOS technology, which, for example, allows, in a matrix embodiment, a planar projection with a suitably high resolution (e. g. of 500 dpi). It is also possible that the scanning unit has several picture recording units, or that the device has several scanning units, each comprising an illumination unit and a picture recording unit. Conveniently the illumination unit is used together for recording the four fingers as well as for recording the thumb, however, the respective picture recording units are separated.

By means of that it is possible to comply with the different spatial arrangement of the four fingers in the region of the hand contact area, on the one hand, and with the thumb contact area arranged at an angle to it with the put-on thumb, on the other hand, in order to achieve an optimal optical picture transmission with high quality, contrast, depth of definition and resolution. The scanning unit, respectively the picture recording unit is, of course, here assigned to the respective hand contact area, respectively thumb contact area. In the case that the device comprises two hand contact areas, respectively thumb contact areas, also for that a single scanning unit each, if necessary consisting of two picture recording units and an illumination unit, is provided.

In order to achieve an optimal picture recording it is provided that the picture recording unit has optical components, for example lenses, mirrors and the like for focusing the picture to be recorded. In particular the arrangement of a mirror just in the beam path of the picture recording of the four fingers makes it possible to fold the optical path here, and to achieve a sufficient resolution and depth of definition. At the same time, the dimension of the housing of the device according to the invention is kept small by the "folded" optical path.

In a preferred modification of the invention it is provided that the finger collection area has a picture collection unit for the finger. The picture collection unit may be, as it will be described further on, designed relatively complex, in particular in order to record the cylinder-like superficies surface of the finger. It is suggested, according to the invention, that at least one picture collection unit is assigned to the finger collection area. In a clever design it is, of course, possible, for example to arrange two or more finger collection areas one beside the other, which then are in connection with one or a small number of picture collection units, like finger collection units, in such a way that the picture collection unit collects, respectively produces, a recording of the finger, in particular its superficies surface.

The problem according to the invention is solved furthermore by a device, the device effecting a finger collection area and this being formed by a supporting edge for the base of the finger, the finger projecting beyond the supporting edge, and, below the projecting finger, a picture collection unit being provided which serves for recording the superficies surface of the finger.

In a geometric approximation the finger corresponds to a cylinder, however not an exact one. The finger lines extend on the superficies line and thus are in different focal planes. Even the touch-free recording of the bottom side of the finger only results in a, depending on the chosen depth of definition, in a limited region a true and not blurred recording of the finger line. The suggestion according to the invention provides a projection as good as possible, in that respect that a picture collection unit is provided which achieves that a large part of the superficies surface of the finger is recorded. As a rule, the top side of the finger is here not decisive for recognising the finger lines, however, the region from nail to nail. This is seen approximately as a large part of the superficies surface of the finger.

In a preferred modification of the invention it is provided that the device has a supporting edge, set back, for example, with regard to the lid of the housing, and that the test person introduces his or her fingers into the device. Cleverly the picture collection unit is arranged in the finger collection area radially around the finger, which is assumed ideally as being cylindrical. If necessary the housing of the device has in the finger collection area an elevation in order to create sufficient space for the picture processing unit to record the circumference of the finger.

The quality of recording of the finger lines is improved by this suggestion in a wide range of the superficies surface, a complete rolled picture of the superficies surface of the finger is presented.

An essential aspect of the invention includes also in particular that the device allows producing a control copy as well as after that or even before that producing of respectively single recordings of the respective fingers, respectively thumbs, in one apparatus. Here the construction type can be chosen so compact and small in order to provide both possibilities in a small housing, in particular, in a mobile housing. The comfort of such an apparatus with the features according to the invention is thus increased considerably.

According to another embodiment of the invention it is proposed to design the picture collection unit out of several single recording elements which are arranged radially around a presumed finger axis.

The optical system used here corresponds to a rolled fingerprint so that the superficies surface of the finger is recorded in a two-dimensional picture plane. For that purpose several, in a preferred example five, recording elements basing on CMOS technology and designed as camera matrices are used which are arranged on the side of the finger and below the finger.

For an optimal illumination of the finger between the recording units illumination units, for example LED banks with preferably green light are provided. The use of green light leads to a better contrast with the resolution.

It is furthermore provided that the views of the superficies surface of the finger recorded by the single recording elements are converted by a picture processing unit into two-dimensional pictures. The arrangement is here chosen in such a way that each single recording element is focused with regard to a special angle segment of the finger, that means it projects this region optically at an optimum. For that purpose it is, for example, provided that the recording element is equipped with suitable optical components, for example lenses, mirrors and so on. These "groove-like" pictures are then processed in such a way in a picture processing unit where a suitable software runs, that a two-dimensional picture is produced, and an angled superficies surface of the finger results without distortion caused by pressure or the like.

In another modification according to the invention it is provided that the supporting edge is arranged either beside the hand contact area or between the two hand contact areas.

The housing of the device according to the invention has, for example, a length of about 40 cm. The scanning units for producing the control copies of the four fingers and the thumb are each arranged in the lateral region of the housing. The center region is therefore available to form the supporting edge below which then the picture collection unit for recording the superficies surface is arranged in a space-saving or space-optimising design.

Conveniently the supporting edge is arranged on or in the top surface of the housing, which makes operating much more easier.

In order to achieve filing of the recordings of the single fingers as faultless as possible, and to secure, in particular, also a faultless assignment of the respectively recorded recordings—it is understood here that, for example, the recording of the left ring finger is also indicated as left ring finger—a method is suggested, in another modification of the invention, according to the invention, where the recording of the single finger is compared with a control copy of the hand, respectively of several or all fingers of a hand, with the single finger. The recording is here the picture of the single finger which is produced individually with additional effort, and covers a larger radial area. The control copy, in contrast to that, projects only the bottom side of the finger, respectively the bottom side of the thumb, planarly, and shows, if necessary, also a projection of the hand lines which are also available for a suitable further processing. For example, the hand line picture may not be checked but filed with the produced data supply. Thus the result is a complete finger and hand line print of the test person. By means of picture processing it is possible to detect the four adjacent fingers and the thumb accordingly, and to indicate them as thumb, index finger, middle finger, ring finger and little finger. The respective passing regions between the fingers are detected reliably in the control copy in the device according to the invention. As this recording is produced simultaneously, the sequence of the fingers is thus defined securely. The sequence of photographing the single fingers is no more decisive here as the views of the superficies surface generated with the picture collection unit are compared, according to the suggestion of the invention, immediately with the control copy, and the control copy has to be divided into several single pictures by the picture processing and the known algorithms for comparing fingerprints have to be applied here. If the comparison does not lead to a congruency the procedure has to be repeated, respectively the has to be repeated under control; fingers already identified accordingly may be left out here in the processing which shortens the processing period accordingly.

By means of the method according to the invention the recording of the finger lines is improved as during recording the finger lines already corresponding plausibility and quality checks are being carried out, and, as long as the test person is close to the apparatus, it can be decided whether the recordings are sufficient and can be used, or whether the scanning procedure has to be repeated one more time.

According to the method of the invention it is equivalent here whether, first of all, the control copy is produced, and, after that, the single recording of the single fingers, or vice versa.

If the comparison is positive, that means the recording of a single finger has been detected successfully in a part of the control copy, an assignment of the recording of the single finger will be carried out. The assignment comprises that the respective recording is assigned to information about the position, for example middle finger of the left hand. In this way the fingerprint map which has to be equipped with the ten fingers can be produced successively electronically, in a way that data can be processed technologically.

It is provided additionally that at least the assigned finger is, respectively becomes, connected via data technology with information about a person. As information about a person here the identity of the person, whose hand is just being recorded, is understood. This information about the identity may be, for example, the name or even a passport number, respectively social security number or the like.

It is here provided to connect the single fingers as well as the control copy with information about the person via data technology. This is, for example, an advantage for control runs.

An essential advantage of the invention is the fact that simultaneously a control copy of both hands is produced. In this control copy then all eight fingers as well as the two thumbs and their assignment, whether it is the left or right hand, is stored. After producing the control copy the respective single recordings of the single fingers and thumbs are compared with it.

Fast processing is achieved by producing, first of all, in particular a control copy of both hands, and, after that, the single pictures. While the single pictures of the following finger are produced the single pictures of the finger recorded before are already compared with the control copy. If the computer has suitable capacity there is no impairment, several processes rather run parallel and simultaneously which leads to a correspondingly higher speed for processing.

In a preferred modification of the invention it is suggested that the sequence of the recordings of the single fingers, respectively the control copy, is arbitrary. The invention is not defined concerning the sequence of the single finger recordings and the control copy. Exactly that is an advantage of the invention that the single recordings can be taken in any sequence and, by means of the, according to the invention, suggested assignment of the single recordings with regard to the control copy, faulty assignments and thus connected data errors are excluded reliably. The result is a method with high data security and, at the same time, optional operation.

It is furthermore suggested according to the invention that the control copy is, first of all, analysed with regard to the single fingers, and, referring to at least one finger or a finger part each, a region of the control copy is provided connected with information about the position of the finger at the hand. The control copy shows four fingers one beside the other. A comparison of the single finger recordings with these very complex control copy needs a lot of calculating and thus time. If, however, first of all, the control copy is divided accordingly intelligently, that means into such control regions which are assigned to a single finger, calculating time is saved, because then only this single control copy region has to be compared with the recording.

However, this procedure can be reduced further. It is, for example, provided that in another modification according to the invention the control copy does not concentrate on the fingers but only on finger parts for example the characteristic finger tip, and only this picture segment is compared with the recording of the complete finger. It is, of course, important here that the respective control copy regions are assigned to information about the position of the finger at the hand in order to assign correctly afterwards the finger recordings at the hand with higher quality.

Besides this method according to the invention in the device, suggested also according to the invention, for example, a comparison and assignment unit is provided which compares the single recordings of the fingers with at least a part of the control copy (for example the region of the control copy), and, depending on this comparison, assigns the singles finger line pictures, respectively fingers, to the different fingers of the hand.

Cleverly the device according to the invention provides by the picture collecting unit recordings of the single fingers and by the scanning unit at least one control copy of the hand with several fingers. Because of this different picture information it is possible that the comparison and assignment unit achieves a correct assignment of the optionally taken finger recordings.

According to a development of the method according to the invention it is provided that the recording of the single finger, in any case after converting the views of the superficies surface into a two-dimensional picture (as recording which is then available) is compared with the region of the control copy, respectively the control copy. According to this method of the invention it is provided that not the rough data of the picture are compared with each other but they are prepared in a suitable way, either with regard to the finger recording or with regard to the control copy, and then the pictures prepared accordingly are set against each other and compared with suitable picture process procedures.

In a preferred modification of the invention it is provided that, one after the other, in a short sequence a number of control copies, respectively recordings, are taken, and the control copies with the best quality, respectively the recordings, are used further on; if a minimum quality level has not been reached, the control copies, respectively the recordings, are produced again. A characteristic for quality may be here, for example, depth of definition or contrast. The pictures are evaluated accordingly automatically, and in a short sequence immediately a large number of control copies, respectively recordings, are produced. The test person does not have to put the hand, respectively the fingers, several times to the device but in a one-time putting-on process already a number of recordings/control copies are produced. By means of a computer capacity which is suitably high also an evaluation can be carried out here very fast, almost in real time, and, if all pictures recorded are below the minimum quality level, the further processing can be interrupted in order to request again the production of another control copy or other recordings. The test person then puts again, if necessary under surveillance, his or her hand suitably at the device where again a number of control copies, respectively recordings, are produced.

In this connection it is pointed out in particular that all characteristics and features, but also all methods, described with regard to the device, can be transferred accordingly also with regard to the formulation of the method according to the invention, and can be used in the sense of the invention, and are regarded as disclosed. The same goes also vice versa, that means constructive, thus device, characteristics mentioned only with regard to the method may also be taken into consideration and claimed in the frame of the device claims and also count for the invention and disclosure.

In another embodiment of the device according to the invention it is provided that the recording elements cover an angle region of about 180°, in particular allow an image of the bottom surface of the finger from nail to nail.

By means of such an embodiment it is achieved that the complete region concerning the taking of the fingerprint is covered by recording elements. It has turned out to be convenient for this purpose to arrange five recording elements.

Furthermore it is suggested in a preferred embodiment of the invention that the device has laterally a hand contact area each, in particular for the left and the right hand of the test person, and between, respectively beside the hand contact area, two picture collection units are provided one each for the fingers of one hand each, and the device allows simultaneously collecting the fingers of both hands. Such a modification according to the invention is shown, for example, schematically in FIG. 4 and described again there. However, according to the invention, also a modification is suggested where the hand contact areas are arranged between the two picture collection units. Such an arrangement also makes it possible to reduce the collection time considerably as two picture collection units, one each for the fingers of one hand, are provided.

Figure 2:
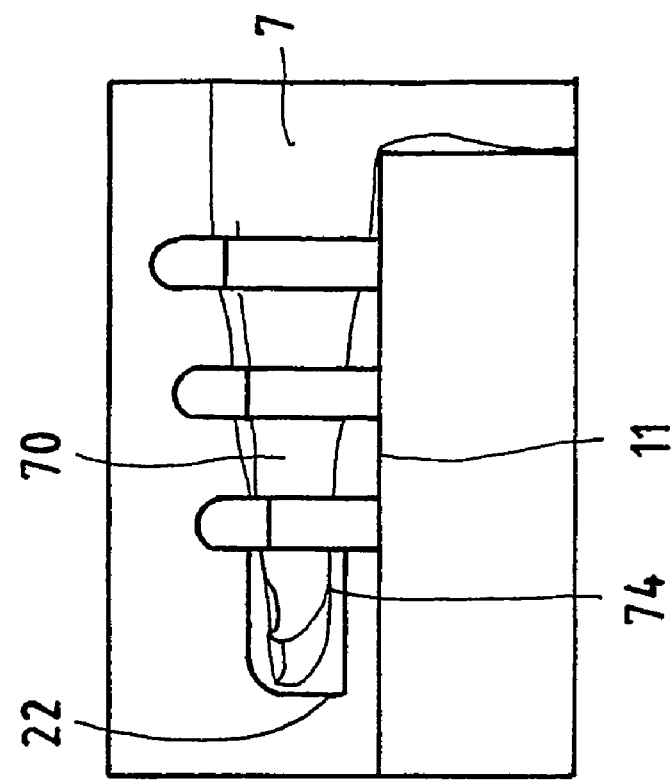
Figure 3:
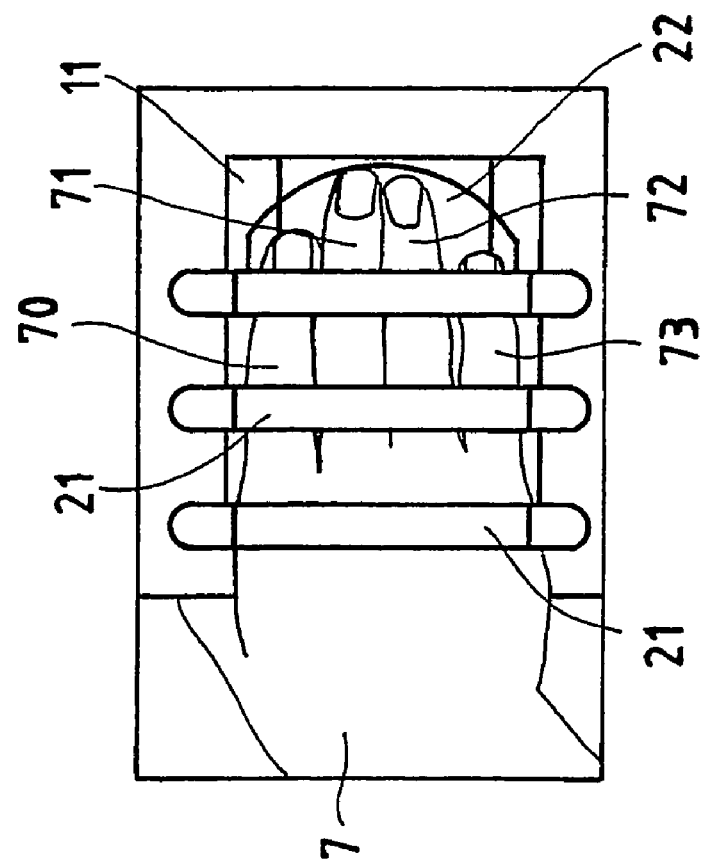
Figure 4:
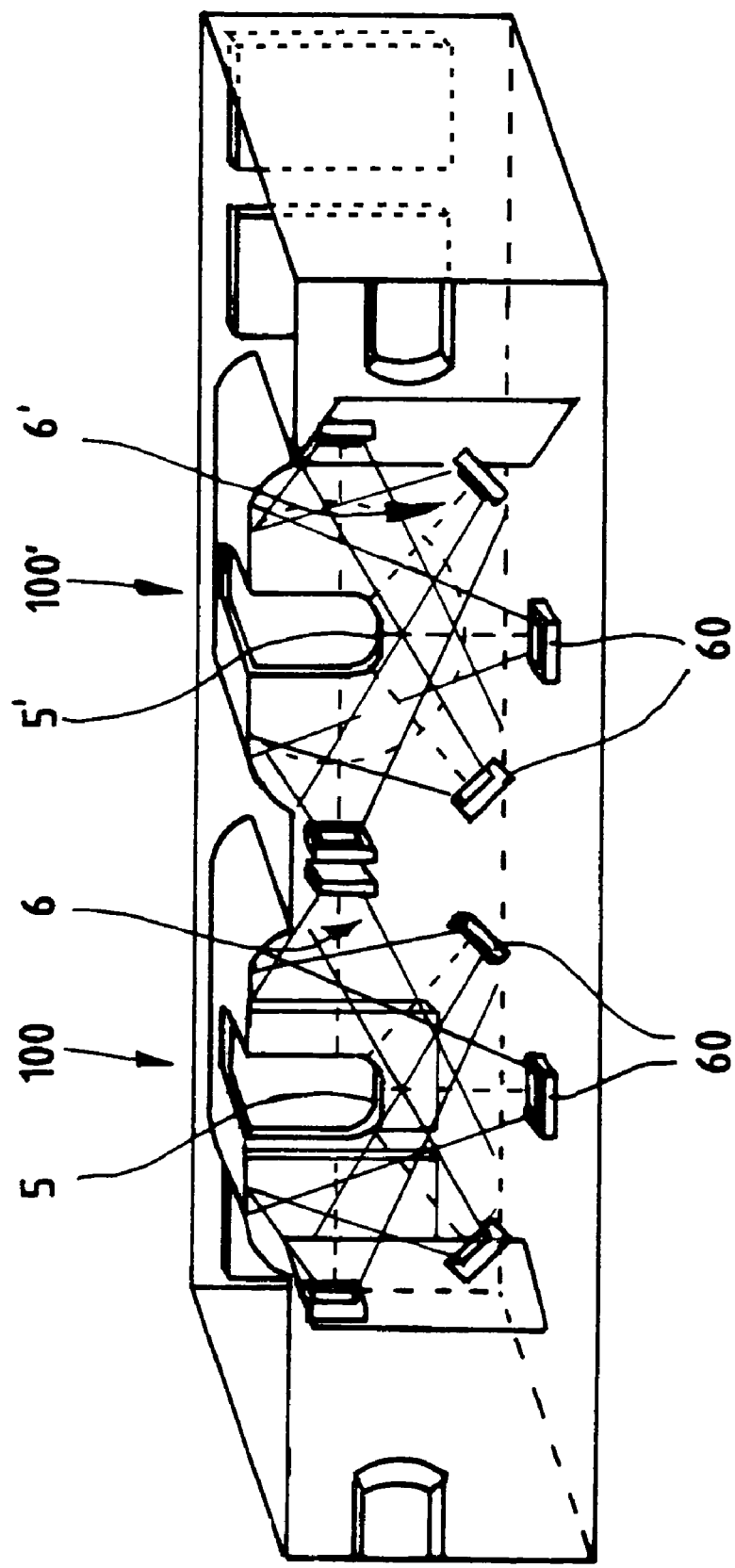
Figure 5:
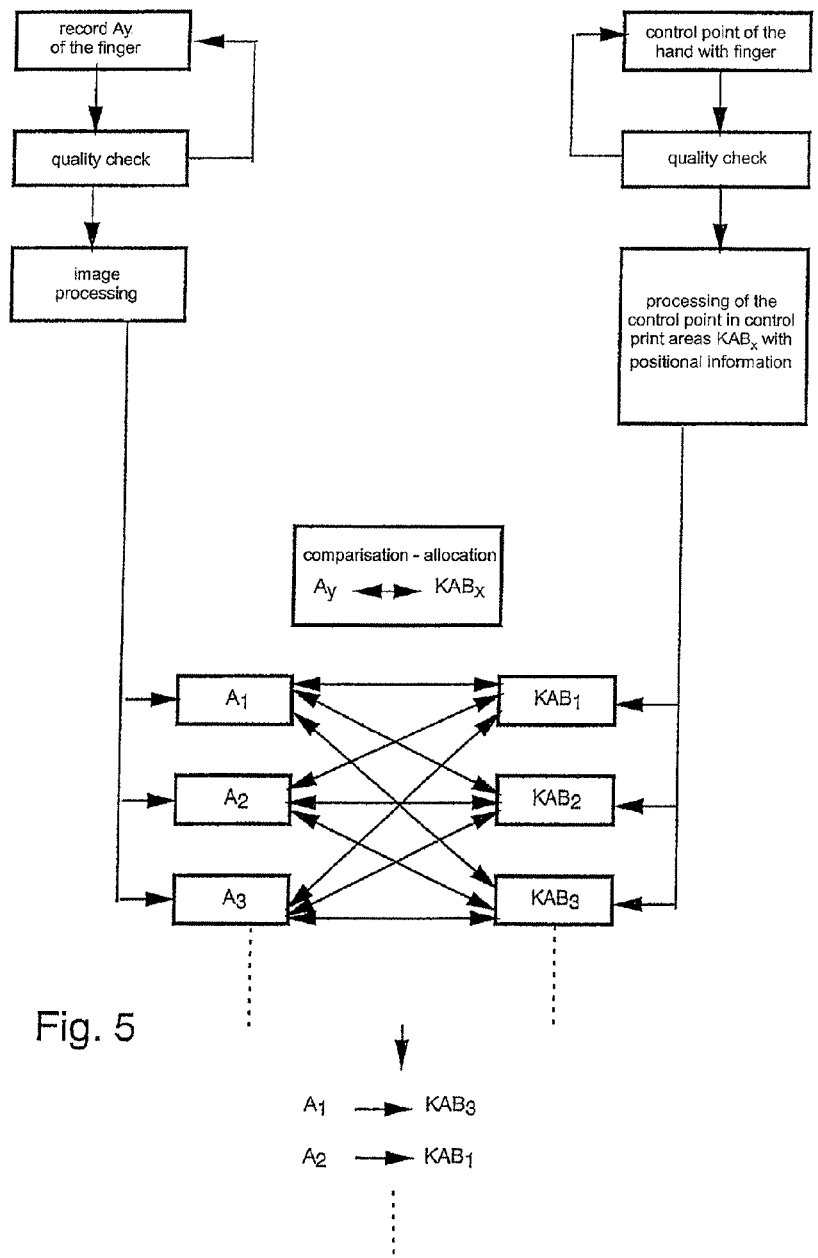

In the drawing the invention is shown schematically. In the drawings:

FIGS. 1, 4 each in a schematic, three-dimensional view the device according to the invention in different modifications;

FIGS. 2, 3 in a top view (FIG. 2) and a view (FIG. 3) details of the hand contact area of the device according to the invention and FIG. 5 a diagram of an example of the method according to the invention.

The device 1 according to the invention is shown schematically in FIG. 1. The housing 10 is designed essentially like a cuboid or box. It is, of course, possible to realise the invention with any differently designed housings. The invention is not defined in this. The housing, for example, has a width of maximal 40 cm, a depth of about 25 cm as well as a height of 12 cm.

At the side surfaces 12 the hand contact area 2 is located. The hand contact area is unfortunately hidden on the left side because of the three-dimensional view.

At the front side 13 on the left and right end part each of the front side 13 the thumb contact areas 3, 3' are arranged. The arrangement has been chosen here in such a way that the thumb contact areas 3, 3' interact with the respective hand contact areas 2 in such a way that the fingers supported on the hand contact area 2 allow at the same time a putting on of the thumb on the thumb contact area 3, this being carried out as ergonomically as possible.

It is also an aspect of the invention to provide a device which can be seized well, that means it can be used ergonomically comfortably. It is provided here that the device can be used either as mobile apparatus or it is stationary designed with a suitably larger housing.

Conveniently it is provided that the hand contact area 2 and the thumb contact area 3, respectively the housing parts 12, 13 holding this area, are arranged essentially rectangularly to each other in such a way that the fingers, if necessary also the palm, on the one hand (in the region of the hand contact area 2), and the thumb, on the other hand (in the thumb contact area 3), can be positioned and scanned simultaneously with the same respective contact area.

Scanning is carried out with the scanning unit 4 arranged in the interior of the housing. In order to protect the interior of the housing in the hand contact area 2, respectively the thumb contact area 3, optically transparent housing parts 11 are provided. These may be consist of, for example, protection glass, plastic or the like. It can be seen clearly that the optically transparent housing parts 11 have a surface facing the thumb, respectively the finger which is set back compared with the other housing surface. By means of that it is achieved that the distance between the thumb/finger and the transparent housing part 11 increases.

The optical arrangement of the scanning unit 4 is now in the interior chosen in such a way that the beam path is guided by the fingers sitting close to the hand contact areas 2 via a mirror 42 to a picture recording unit 40 for the four fingers, and, in contrast to that, the light for the thumb supported by the thumb contact area 3 is projected directly to a picture recording unit 41. The result is that the picture recording unit 41 for the thumb is arranged at the edge of the housing, and, in contrast to that, the picture recording unit 40 for the four fingers is arranged in the interior of the housing. For clearness sake the arrangement of other optical components, for example lenses and so on, has been left off, however, it is obvious that components of this kind can be used in order to generate a sharp picture. The plane of focus is chosen here in such a way that it is just in the position of the palm which usually can be assumed, if it is introduced in the pocket-like 20 hand contact area.

The result is that for a proper recording it is decisive that the fingers to be recorded are optically in the correct position. For that purpose basically guide means 21 are provided, for example, guide bows which arc the optically transparent housing part 11, and result in a guide for the inserted hand rectangularly to the lateral housing wall 12 as well as in this plane. The hand is actually introduced in an optically exact or exact as possible system, and positioned in such away that a picture with high quality can be taken. Here it is in particular provided that for improving of the focus the distance of the bows, respectively the position of the guide means with regard to the side wall 12, can be adjusted, fixed, so that the bottom surface of the hand which has to recorded, respectively the finger surface, can be positioned exactly in the focal plane.

It has already been pointed out that it is convenient to choose a touch-free projection method for recording the finger lines. The result is a certain distance between the bottom side of the hand 74 and the surface of the optically transparent housing part 11 (see FIG. 3). This achieved in particular by a receiving pocket 22 into which the fingertips can be introduced. As in particular the region of the fingertips is interesting, here an arrangement is chosen where only the fingertips are guided accordingly, or the fingers are supported by a very thin bow in order to reach the distance as desired.

The arrangement of the hand 7 in the pocket-like 20 designed hand contact area 2 is also shown in FIG. 2. Here several guide means 21 which are designed here like bows are provided which lead the hand accordingly. Corresponding to the hand which tapers towards the front, if necessary, also the free width and height of the guide means is reduced towards the back.

Besides the hand contact areas 2, respectively the thumb contact area 3, arranged essentially at the side, approximately in the center of the housing 10 on the top side 14, elevated compared with the other surface, the finger collection area 100 is located. Here a supporting edge 5 is provided on which a hand is accordingly put and, touch-free, the superficies surface of the finger is recorded by the picture collection unit 6. Here a picture is generated which can be evaluated electronically, respectively data technologically, in a similar way as it is done with the scanning unit 4.

The arrangement of the picture collection unit 6 is chosen here in such a way that a number of recording elements 60 are arranged radially in the bottom region of the put-on finger, that means in the region of the finger plane, and each project a certain angle segment focused. Here on the top two recording elements 60 face each other, the bottom side is scanned by a recording element arranged here rectangularly, and in the center region further recording elements are arranged at an angle of about 45°. By means of this five recording elements altogether are provided which produce five stripe-shaped part segments of the superficies surface of the finger which can be seen as cylinder.

The region between the single recording elements 60 is equipped with illumination units 61. By means of that an illumination as shadow-free as possible is reached. The recording elements 60 are equipped preferably with optical components, for example lenses 62.

FIG. 4 shows an embodiment of the device according to the invention which is very similar to the apparatus shown in FIG. 1.

The essential difference is that instead of one picture recording unit 6 in FIG. 4 two finger collection units 100, 100' with a picture collection unit 6, 6' each are arranged preferably one beside the other, and that this two finger collection units 100, 100' are located between the hand contact areas 2, 2'.

Groove-shaped supporting edges 5, 5' are also provided double in order to present a supporting surface for the fingers.

Also the construction in the interior of the device shown in FIG. 4 is essentially identical with the one shown in FIG. 1, only the equipment for the recording elements is double accordingly.

Such a device allows taking simultaneously, for example at the same time, the fingerprints of the two thumbs, the two index fingers and so on. The required time for collecting the finger lines is reduced considerably.

In the flow chart shown in FIG. 5 the method according to the invention is described. In the left part of this chart, first of all, the recording of the single fingers of the hand of the test person is indicated. The single recordings are indicated, for example, with $A_y$. The test person has all his or her fingers, one after the other, be collected serially, for example by means of the device according to the invention. For each finger a picture $A_y$ is done.

Now a quality check is next, in order to make sure, for example, that only sufficiently sharp pictures are processed. If pictures are unclear, not sharp, blurred or cannot be used for other reasons another recording of the finger is caused.

If the finger is, for example, recorded with an arrangement as the one in FIG. 1, where the finger is supported on the supporting edge 5 of the finger collection area 100, a superficies surface of the finger is collected by the number of the different, radially arranged recording elements 60, which has to be converted by the picture processing, if necessary, first of all, into a planar picture. This can be carried out with suitable picture processing routines without any problems.

The invention leaves it open whether first of all the quality check or the picture preparation is carried out, or whether this series is turned around.

As a result after the picture preparation a number of recordings $A_1$ to $A_n$ are provided (they do not have information about the position of the fingers at the hand yet), which are, if necessary, processed immediately after their production, or not before the collection of the recordings of the fingers is concluded. The invention is also open with regard to this step.

In the right part of the chart it is, first of all, shown that the control copy of the hand with fingers is made. This is the copy of the bottom side of the hand in which already the finger lines can be recognised as well.

Here also a quality check will follow, and here also a repetition of the control copy is provided if the quality is faulty.

Cleverly then the preparation of the control copy is carried out into control copy regions $KAB_x$. First of all, it is decisive here to define the information about the position of the single fingers at the hand. This can be reached by characteristic facts in the control copy, for example, by suitable picture scanning and picture processing. The term control copy region is here not restricted to the fact that the produced control copy is divided into a number of control copy regions, but only the position information has to be investigated. It is convenient if actually a division is carried out, as then the effort for a comparison, respectively an assignment, of the single finger recordings is lowered considerably.

However, also a solution is part of the invention where, for example, a control copy is divided into four identical control copy regions which have the same information, but differ with regard to information about the position of the single fingers at the hand.

A number of control copy regions $KAB_x$ are provided which then serve for comparing, respectively assigning, the recording.

In this concluding step for the respective recording $A_y$, the fitting control copy $KAB_x$ is searched, and, if the congruency is sufficient, according to the criteria of the picture processing their assignment is defined.

Thus the result is that recording 1, for example, is assigned to the control copy $KAB_3$, the information about the position of the control copy $KAB_3$ concerning, for example, the middle finger of the right hand.

The claims filed with the application now and to be filed later on are attempted formulations without prejudice for obtaining a broader protection.

If here, on closer examination, in particular also of the relevant prior art, it turns out that one or the other feature may be convenient for the aim of the invention, however, not decisively important, of course, already now a formulation is striven for which does not contain anymore such a feature, in particular in the main claim.

References in the sub-claims relate to the further design of the matter of the main claim through the characteristics of the respective sub-claim. These are, however, not to be understood as a waiver of independent protection of the matter for the characteristics of the referred sub-claims.

Characteristics only disclosed in the description may be claimed in the course of proceedings as being of inventive importance, for example to distinguish from the state of the art.

Characteristics disclosed only in the description or single characteristics of claims comprising a number of characteristics, may be used at any time to distinguish from the state of the art in the first claim, and this is even if such characteristics have been mentioned in connection with other characteristics, respectively achieve particularly convenient results in connection with other characteristics.

The invention claimed is:

1. A device for the touch-free recognition of finger lines comprising at least one finger collection area, at the finger collection area at least one picture recording unit being provided which serves for recording a large part of the superficies surface of the finger, wherein the finger collection area being formed by a supporting edge for a base of the finger, the finger projecting beyond the supporting edge, and below the projecting finger the picture recording unit is provided, the picture recording unit comprises several single recording elements which are arranged radially around a presumed finger axis; and wherein a comparing and assigning unit of the device is provided, which compares the single recordings of the fingers with at least a part of a control copy, and, depending on this comparison, assigns single finger line pictures to different fingers of the hand.

2. The device according to claim 1, characterised in that the recording elements cover an angle region of about 180°, in particular allow a projection of the bottom side of the finger from nail to nail.

3. The device according to claim 1, characterised in that two or more finger collection areas are arranged on beside the other or each finger collection area are in connection with one or a small number of picture recording units.

4. The device according to claim 1, characterised in that between the recording element illumination units are arranged or the illumination units emit green light.

5. The device according to claim 1, characterised in that the recording element, respectively the picture recording unit, comprises optical components.

6. The device according to claim 1, characterised in that the picture collection unit, respectively recording element, is designed as electronic picture collection unit, respectively recording element.

7. The device according to claim 1, characterised in that the supporting edge is arranged beside a hand contact area or between hand contact areas.

8. The device according to claim 1, characterised in that a housing is provided and the supporting edge is arranged on or in the top side of the housing.

9. The device according to claim 1, characterised in that the views of the superficies surface of the finger recorded by the single recording elements are converted into two-dimensional pictures by a picture processing unit.

10. The device according to claim 1, characterised in that the device produces recordings of the single fingers through the picture collection unit, and at least one control copy of the hand with several fingers through a scanning unit.

11. The device according to claim 1, characterised in that scanning of the finger, respectively the thumb, is carried touch-free.

12. The device according to claim 1, characterised in that a scanning unit is provided and the scanning unit has an illumination unit and a picture recording unit.

13. A method for recognition of finger lines by using a device, the recording of a single finger being compared with a control copy of a hand, respectively several or all fingers of the hand with the single finger, in which if the comparison has been positive, the recording of the single finger is assigned, characterised in that one after the other, in sequence, a number of control copies, respectively recordings, are taken, and the control copies, respectively the recordings, are used further, or, if a predetermined minimum depth of definition or contrast has not been reached, the control copies, respectively recordings, are taken one more time, wherein the device for the touch-free recognition of finger lines comprising at least one finger collection area, at the finger collection area at least one picture recording unit being provided which serves for recording a large part of the superficies surface of the finger, characterized in that the picture recording unit comprises several single recording elements which are arranged radially around a presumed finger axis.

14. The device according to claim 5, wherein the optical components are lenses.

* * * * *